United States Patent [19]

Hughes

[11] 4,299,292
[45] Nov. 10, 1981

[54] FOLDING BOOM CONSTRUCTION INCLUDING ROLLERS AND RAMPS FOR LIFTING WHEELS CLEAR OF GROUND

[75] Inventor: William F. Hughes, Kalamunda, Australia

[73] Assignee: Australian Agricultural Machinery Pty. Ltd., Belmont, Australia

[21] Appl. No.: 66,459

[22] Filed: Aug. 14, 1979

[51] Int. Cl.³ .............................................. A01B 73/00
[52] U.S. Cl. .................................. 172/311; 172/395; 280/42; 280/43; 280/656
[58] Field of Search ............... 172/311, 395, 413, 456, 172/662; 280/43, 43.23, 411 A, 42, 411 R, 639, 656

[56] References Cited

U.S. PATENT DOCUMENTS

| | | | |
|---|---|---|---|
| 3,491,836 | 1/1970 | Doepker | 172/311 |
| 3,637,027 | 1/1972 | Kovar | 172/456 X |
| 4,137,852 | 2/1979 | Pratt | 172/311 X |
| 4,172,537 | 10/1979 | Gandrud et al. | 172/311 X |

FOREIGN PATENT DOCUMENTS 217232 11/1967 Sweden ................................. 280/43

*Primary Examiner*—Richard T. Stouffer
*Attorney, Agent, or Firm*—Harness, Dickey & Pierce

[57] ABSTRACT

A folding boom construction comprising a wheeled frame, a boom disposed transversely of the wheeled frame, the boom being adapted to support one or more cultivating tools, the boom being coupled to the wheeled frame to be rotatable about a substantially transverse axis of the wheeled frame, the boom being rotatable about an axis transverse of the boom such that on rotation about the axis transverse to the wheeled frame the cultivating tools can be raised or lowered from the ground and when the tools are in the raised position the transverse axis is substantially upright such that the boom can be swung from the transverse position to a fore-and-aft position.

3 Claims, 8 Drawing Figures

FOLDING BOOM CONSTRUCTION INCLUDING ROLLERS AND RAMPS FOR LIFTING WHEELS CLEAR OF GROUND

This invention relates to an improved folding boom construction for agricultural equipment.

In various types of agricultural equipment operating components of the equipment are mounted on a wide boom which is positioned transversely of the direction of travel and it is necessary to fold the boom to allow the equipment to pass through gates and the like, and for transport. When the operating components comprise cultivating tools it is necessary to raise the tools from the ground before the boom can be folded.

It is an object of this invention to provide a folding boom construction in which the folding of the boom between the operative and transport position can be readily effected when cultivating tools are mounted on the boom.

In one form the invention resides in a folding boom construction comprising a wheeled frame, a boom disposed transversely of the wheeled frame, the boom being adapted to support one or more cultivating tools, the boom being coupled to the wheeled frame to be rotatable about a substantially transverse axis of the wheeled frame, the boom being rotatable about an axis transverse of the boom such that on rotation about the axis transverse to the wheeled frame the cultivating tools can be raised or lowered from the ground and when the tools are in the raised position the transverse axis is substantially upright such that the boom can be swung from the transverse position to a fore-and-aft position.

The invention will be better understood by reference to the following description of one specific embodiment thereof as shown in the accompanying drawings.

Figure 1:
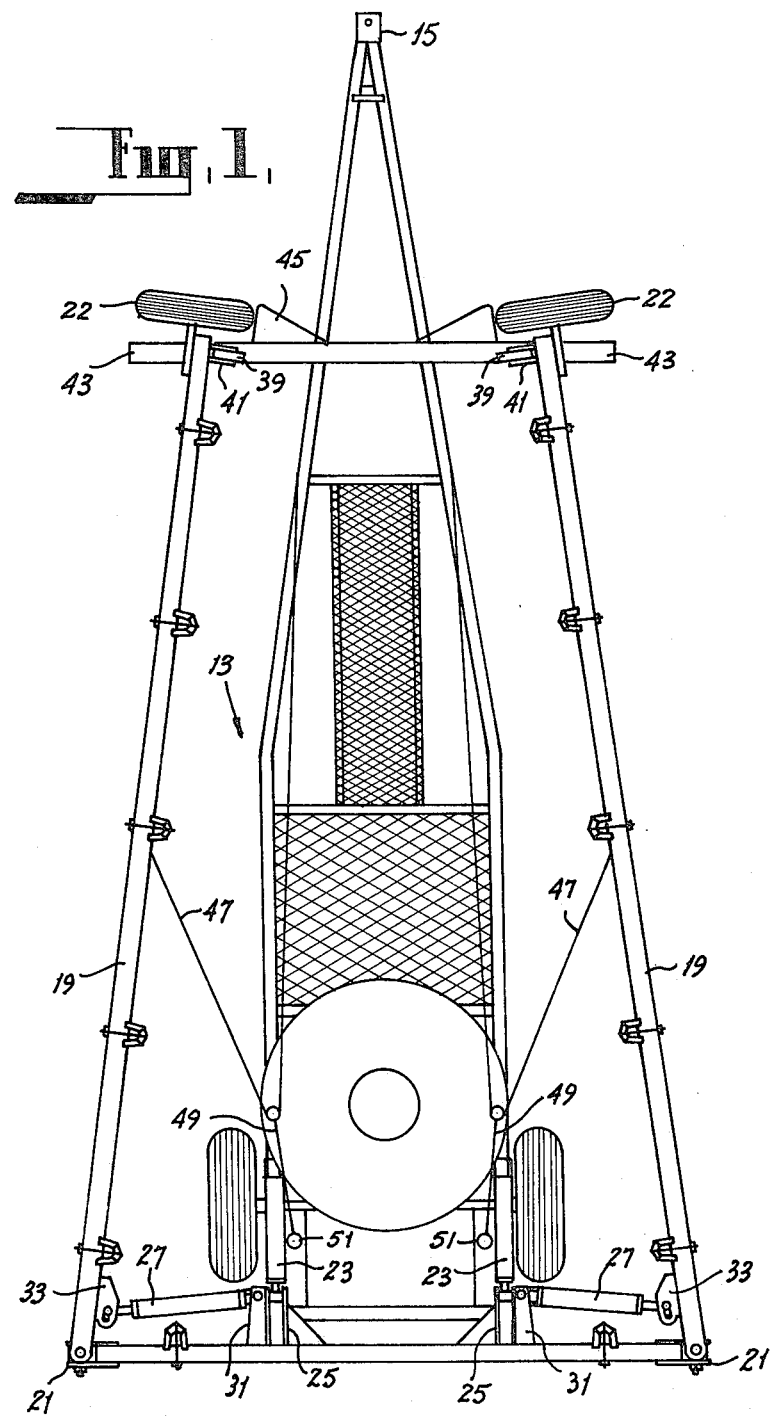
FIG. 1 is a plan view of a folding boom construction according to the embodiment with the boom in a folded position.
Figure 2:
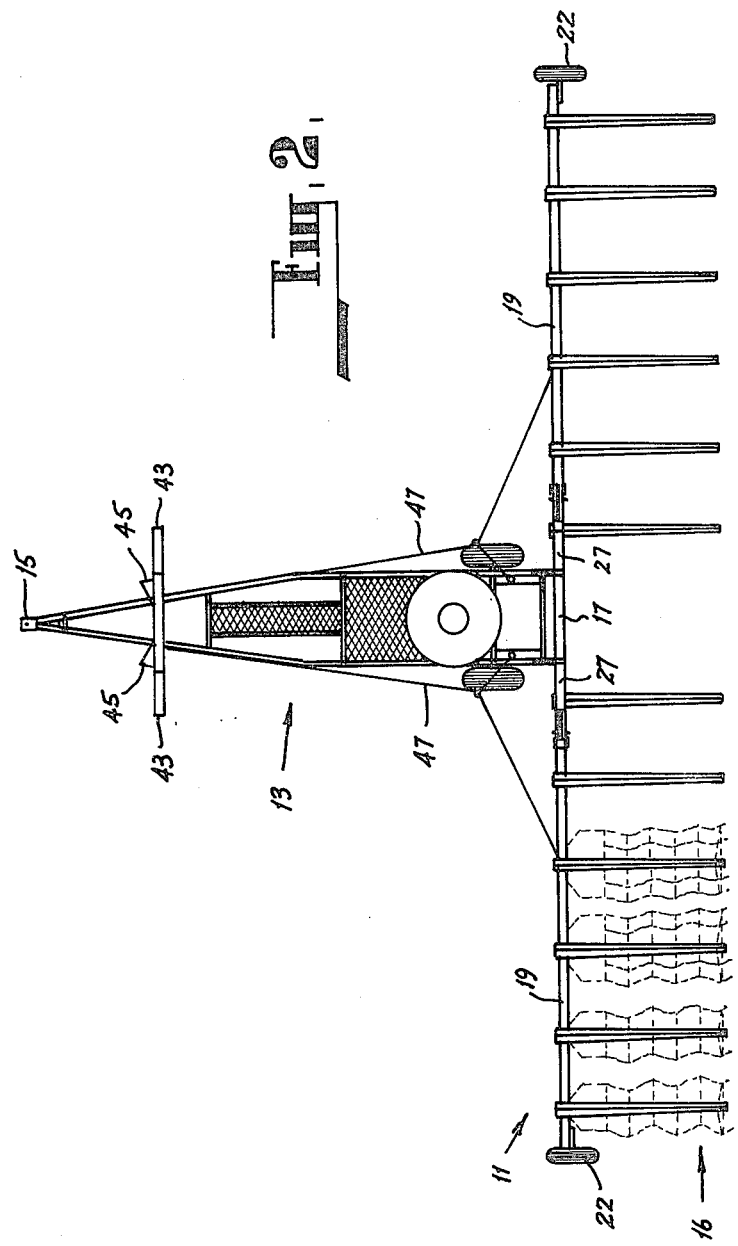
FIG. 2 is a plan view of the folding boom construction with the boom in a transverse position.
Figure 3:
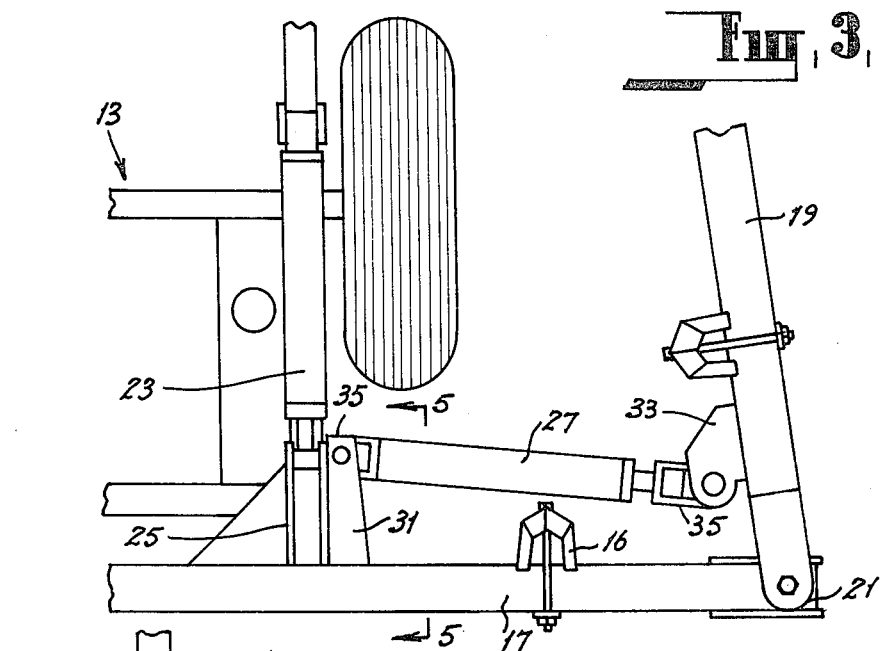
FIG. 3 is a fragmentary plan view showing the coupling between the central section and one side section of the boom with the boom in the folded position.
Figure 4:
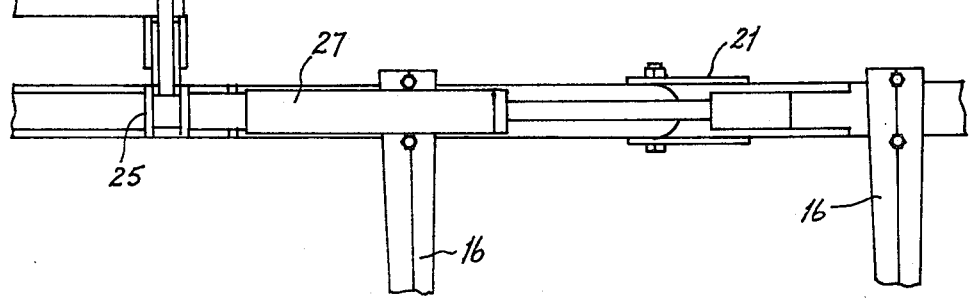
FIG. 4 is a fragmentary plan view showing the coupling between the central section and one side section of the boom with the boom in the transverse position.
Figure 5:
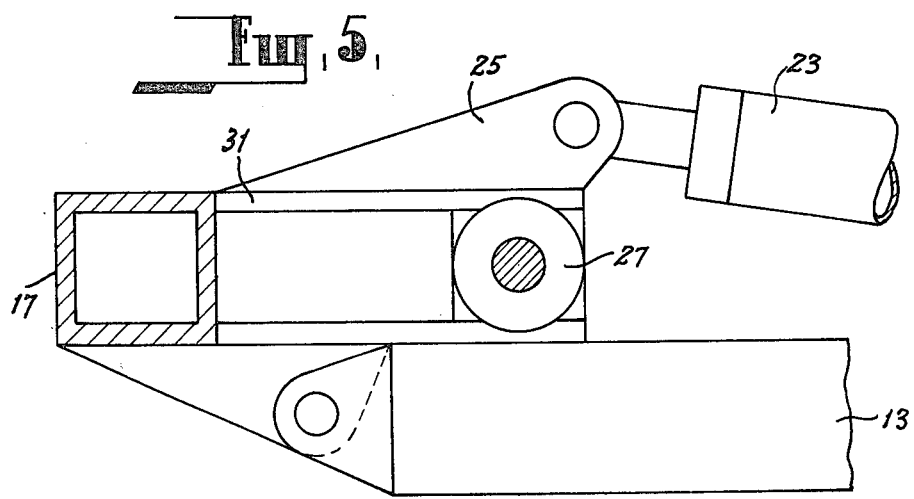
FIG. 5 is a fragmentary sectional elevation along the line 5—5 of FIG. 3 showing the coupling arrangement between the boom and the wheeled frame with the boom rotated such that the cultivating tools are in the raised position.
Figure 6:
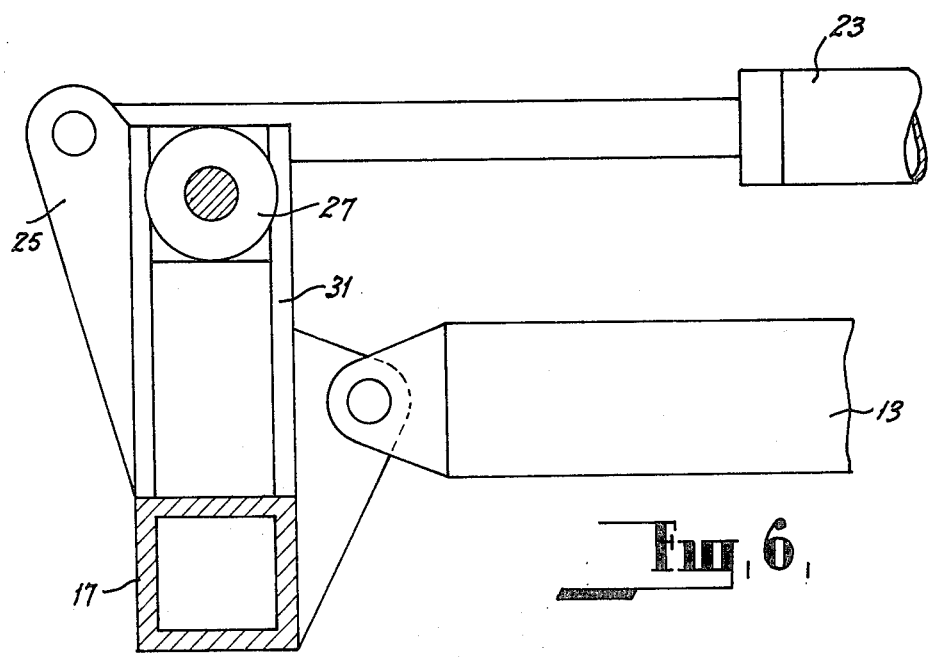
FIG. 6 is a fragmentary sectional elevation along the line 5—5 of FIG. 3 showing the coupling arrangement between the boom and the wheeled frame with the boom rotated such that the cultivating tools are in the lowered position.
Figure 7:
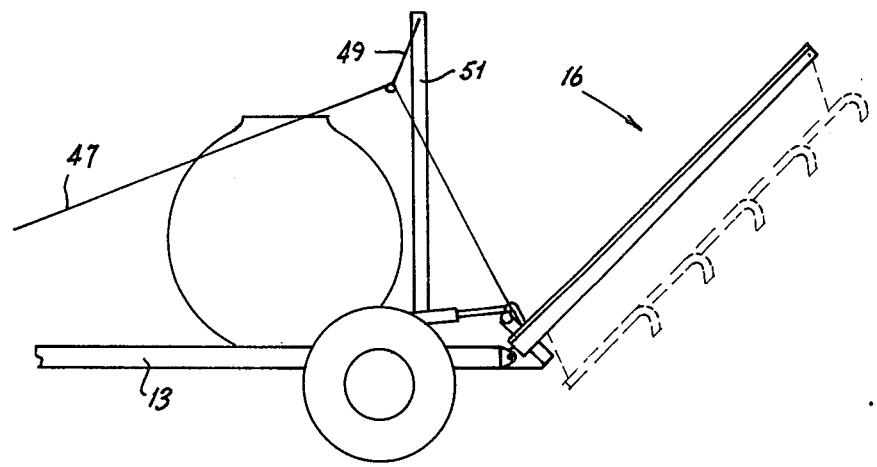
FIG. 7 is a side elevational view showing the cultivating tools in a partially raised position.
Figure 8:
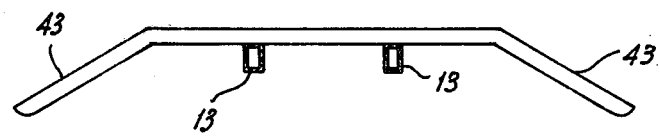
FIG. 8 is a sectional elevation of the wheeled frame showing the ramps.

As shown in the drawings, a boom 11 is located transversely of a wheeled frame 13. The forward end of the wheeled frame 13 is fitted with means 15 for hitching it to a tractor or like towing vehicle. The boom is adapted to support cultivating tools 16 such as harrows. In this embodiment the boom is located across the rear of the wheel frame 13 and includes a central section 17 and two side sections 19 disposed one on each side of the central section 17. The inner ends of the side sections 19 are each pivotally connected to the adjacent end of the central section for rotation about at least one axis transverse of the boom. However, it is preferable that the inner ends of the side sections 19 are each pivotally connected to the adjacent end of the central section 17 by means of a universal joint 21 for rotation about any of a plurality of axes transverse of the boom. Each side section 19 is supported on a wheel 22 located at or towards the outer end thereof and tracking substantially parallel to the wheels of the wheeled frame. The boom is coupled to the wheeled frame to be rotatable about an axis substantially transverse of the wheeled frame such that the cultivating tools may be raised from or lowered into engagement with the ground on rotation of the boom. In this embodiment the boom rotates through an angle of approximately 90 degrees as the cultivating tools move between the raised and lowered positions. The boom may be coupled to the wheeled frame by pivotally mounting the central section 17 of the boom to the rear of the wheeled frame for rotation about an axis parallel to the central longitudinal axis of the boom. The rotational movement of the boom about the axis substantially transverse of the wheeled frame is effected by means of one or more first hydraulic rams 23 pivotally connected between the wheeled frame and one or more corresponding cranks 25 rigidly mounted on the central section 17 of the boom. A hydraulic ram 27 is coupled between the central section 17 and each side section 19 such that on actuation of the ram each side section can be swung about said axis transverse of the boom between the transverse position and a fore-and-aft or folded position. In this embodiment each ram 27 is pivotally coupled between brackets 31 and 33 mounted on the central section 17 and side sections 19 respectively; each ram is preferably coupled between the brackets 31 and 33 by means of universal joints 35. The rams 27 are mounted such that the lines of action thereof are each substantially parallel to a line transverse of the particular axis about which the respective side sections 19 pivot when moving between the transverse and fore-and-aft positions. When the boom 11 is in the transverse position with the cultivating tools in the lowered or operative position, the axes transverse of the boom about which the side sections 19 pivot are substantially horizontal and substantially parallel to the longitudinal axis of the wheeled frame. The cultivating tools are moved into the raised position by rotating the boom about the axis substantially transverse of the wheeled frame such that said axes transverse of the boom are in a substantially upright position. The side sections 19 may then be swung from the transverse position to the fore-and-aft or folded position.

A roller 39 is mounted on an axle supported between brackets 41 mounted on each side section 19 adjacent the wheel 22; the axis of rotation of each roller is substantially parallel to the axis of rotation of its adjacent wheel 22. Each roller is adapted to ride up one of a pair of suitably located ramps 43 projecting outwardly and downwardly from the wheeled frame as the side sections move to the fore-and-aft position, thus lifting the wheels 22 clear of the ground. The folding action of the boom is halted when the wheels 22 butt against stop members 45 fitted to the ramps. Hydraulic pressure in the rams 27 maintains the boom in the folded position, however, locking means may be provided to hold the boom in position as an additional safety measure.

Cables 47 extending between the wheeled frame and the side sections 19 of the boom are provided to brace the boom when in its transverse position. The cables 47 are maintained taut as the boom moves between the transverse and fore-and-aft position by means of a weight (not shown) attached to each cable 47 by means of a further cable 49. The weights are located in tubular upright members 51 which have guide means at their upper ends over which the cables 49 pass.

The two sets of hydraulic rams 23 and 27 controlling movement of the boom are coupled to a hydraulic circuit. The two sets of rams may be controlled by separate control levers or alternatively a hydraulic fluid by-pass system may be provided such that when one set of rams has completed its operation the second set becomes operational.

In use the boom is disposed transversely of the wheeled frame. When it is necessary to fold the boom to allow the unit to pass through a gate of the like, or for transport, the operator actuates the first set of hydraulic rams 23 which cause the boom to pivot about said axis transverse to the wheeled frame, thus moving the cultivating tools from the lowered to the raised position. As a result the axes which are transverse of the boom and about which the boom folds are moved from the substantially horizontal position to the substantially upright position. When the operation of the first set of rams 23 has completed the second set of rams 27 become operational, either from a hydraulic fluid by-pass from the first set of rams or by a separate control lever actuated by the operator. Actuation of the second set of rams causes each side sections 19 of the boom to pivot towards the folded position about its respective axis substantially transverse of the boom. As the side sections 19 approach the wheeled frame the rollers 39 mounted on the side sections engage the ramps 43 on the frame; the rollers ride up the ramps, thus lifting the wheels 22 clear of the ground. With the boom folded in this position, the equipment can be easily transported. The sequence of operation of the sets of hydraulic rams 23 and 27 is reversed when the boom is to be returned to the operational position.

When the boom is in the transverse position with the cultivating tools in the lowered position the axes which are transverse of the boom and about which the side sections 19 pivot are substantially horizontal and substantially parallel to the longitudinal axis of the wheeled frame. Thus each side section is able to pivot with respect to the central section of the boom within a substantially vertical plane as the unit traverses uneven ground. As a result more uniform cultivation of the soil is obtainable than would otherwise be possible with a rigid boom. Although the side sections 19 are braced by the cables 47, the universal joints 21 coupling each side section to the central section of the boom permit a degree of relative movement in a substantially horizontal plane between the central section and each side section.

Although the invention has been described with reference to one specific embodiment it is not limited thereto as various alterations may be made without departing from the scope of the invention.

I claim:

1. A folding boom construction comprising a wheeled frame adapted to be pulled in a direction parallel to the longitudinal axis thereof, a boom assembly adapted to carry tools and comprising a central section, first and second end sections and first and second universal joints each connecting one end of each of said end sections to a respective end of said central section for pivotal movement of said end sections relative to said central section about at least one axis, a pair of wheels each being mounted contiguous to the opposite end of a respective one of said end sections for rotation about a fixed axis that is parallel to the length of the respective end section, means for supporting said boom central section on said wheeled frame for pivotal movement relative to said wheeled frame about a transverse axis, first hydraulic means interposed between said frame and said boom central section for pivoting said boom assembly relative to said frame about said transverse axis between an operative position in which the tools adapted to be carried by said boom assembly may engage the ground and a raised position in which the tools adapted to be carried by said boom assembly will be clear of the ground, said one axis of said universal joints being horizontally disposed when said boom assembly is in its operative position for pivotal movement of said boom end sections relative to said central section to conform to uneven ground conditions, said one axis of said universal joints being vertically disposed when said boom assembly is in its raised position, second hydraulic cylinder means interposed between said boom central section and each of said end boom sections, said second hydraulic cylinder means being operative for pivoting said boom end sections relative to said boom central section when said one axis is vertically disposed for movement of said boom end sections from an aligned position wherein said boom end sections are aligned with said boom central section and a storage position wherein said boom end sections extend generally parallel to the longitudinal axis of said wheeled frame, said wheels being adapted to support the respective end section ends during a substantial portion of their pivotal movement, a pair of rollers each mounted on a respective one of said end sections for rotation about an axis that is substantially parallel to and spaced from the axis of rotation of the wheel carried by the respective end section, and a pair of ramps each projecting downwardly and outwardly from a respective side of said frame, each of said ramps being so aligned with a respective one of said rollers that as said boom end sections pivot from their aligned positions to their storage positions each of said rollers rolls up a respective one of said pair of ramps as said end sections move toward said storage position, thus lifting said wheels clear of the ground, the axis of said rollers each being spaced sufficiently from the axis of the wheel carried by the respective end section so that said wheels will clear said ramps as said rollers engage said ramps to move said boom end sections to their storage positions.

2. A folding boom construction as claimed in claim 1 wherein a cable extends between each side of the wheeled frame and a respective one of the end sections so as to brace the boom assembly when in the aligned position.

3. A folding boom construction as set forth in one of claims 1 or 2, wherein the second hydraulic cylinder means consists of a pair of hydraulic cylinder assemblies and having means for pivotally connecting one component of each of said pair of cylinder assemblies directly to a respective end of the boom center section and means for directly pivotally connecting the other component of each of said cylinder assemblies to a respective one of said boom end sections.

* * * * *